M. PRIGGA.
LIQUID FUEL SPRAYER FOR FURNACES.
APPLICATION FILED MAY 28, 1913.

1,151,283. Patented Aug. 24, 1915.

Inventor
Matthis Prigga

Witnesses

By Percy H. Moore
Attorney

UNITED STATES PATENT OFFICE.

MATTIHS PRIGGA, OF MOSCOW, RUSSIA.

LIQUID-FUEL SPRAYER FOR FURNACES.

1,151,283.  Specification of Letters Patent.  Patented Aug. 24, 1915.

Application filed May 28, 1913. Serial No. 770,344.

*To all whom it may concern:*

Be it known that I, MATTIHS PRIGGA, a subject of the Emperor of Russia, residing at Boutyrki, Baschilowskaja Ulitza No. 7, log. 4, Moscow, Russia, have invented certain new and useful Improvements in Liquid-Fuel Sprayers for Furnaces; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to liquid fuel sprayers for furnaces and more especially to that type of such sprayers in which the fuel is supplied upon a slightly inclined wall or pan and then sprayed at the interior front edge of this pan or wall by the action of a steam jet passing through a slit arranged beneath the said edge and parallel to the same.

The main object of the said invention is to provide means for heating the oil to be sprayed to such a degree that also very thick oil may be easily and finely sprayed by the action of the steam jet.

The invention consists essentially in providing near and around the steam conduit of the sprayer several passages or conduits for the fuel and to lead the oil to be sprayed successively through all the said passages or conduits, so that the same is successfully heated by the steam used for spraying purposes.

The proposed invention is hereinafter described with reference to the accompanying drawing, on which—

Figure 1:
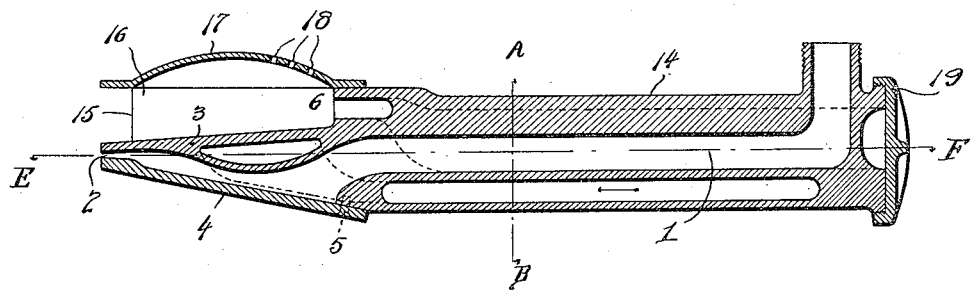
Figure 2:
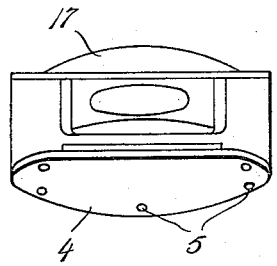
Figure 3:
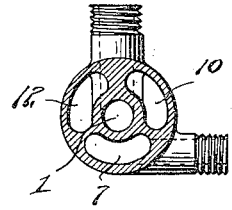
Figure 4:
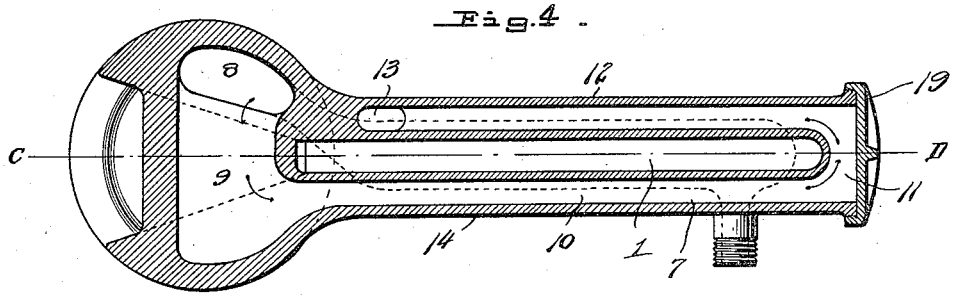

Figure 1 is a longitudinal section of the device; Fig. 2 is an end view of the spraying device; Fig. 3 is a section taken on the line A—B of Fig. 1; and Fig. 4 is a section taken on the line E—F of Fig. 1.

In the embodiment illustrated, the steam conduit 1 supplies a steam jet through the slit 2 formed by the inclined bottom 3 of a pan like casing 3, 16 and the cover 4, fixed by means of screws or bolts 5. The oil to be sprayed is delivered at 6 upon the rear end of the said inclined bottom 3 between the side walls 16 of the pan.

On its way to the discharge opening 15 the oil passes successively the conduits 7, 8, 9, 10, 11, 12, 13 formed in the shaft like body 14 and the head 3, 16 of the sprayer near the walls heated by steam. The way of the fuel is indicated by arrows in the Figs. 1 and 2.

In the cover 17 of the pan are provided several small air inlets 18, preferably at the rear end of same. The cap 19 serves to close the fuel conduits 10 and 12 and the passage 11 between the said conduits.

What I claim is:

A liquid fuel sprayer comprising a body portion, terminating at one end in an enlarged head portion, said head portion comprising side walls, top and bottom covers and an intermediate bottom wall, said bottom cover and said intermediate bottom wall converging at their outer ends to form a steam jet, a steam conduit in communication with said jet, fuel conduits arranged in said body portion adjacent to and parallel with said steam conduit and connected by means of ducts to form a circuitous passageway and means for feeding fuel to said passageway, said passageway terminating in a delivery opening adjacent said steam jet.

In testimony that I claim the foregoing as my invention, I have signed my name in presence of two subscribing witnesses.

MATTIHS PRIGGA.

Witnesses:
 AUG. MIGHIS,
 W. HEININGER.

Copies of this patent may be obtained for five cents each, by addressing the "Commissioner of Patents, Washington, D. C."